United States Patent Office 3,528,945
Patented Sept. 15, 1970

3,528,945
ACETYLACETONATES AS POLYCONDENSATION CATALYSTS IN THE DIRECT ESTERIFICATION METHOD OF PREPARING POLYESTERS
Mary J. Stewart, Riddlewood, Media, and John A. Price, Swarthmore, Pa., assignors to FMC Corporation, Philadelphia, Pa., a corporation of Delaware
No Drawing. Filed Aug. 30, 1967, Ser. No. 664,264
Int. Cl. C08g 17/015
U.S. Cl. 260—75
4 Claims

ABSTRACT OF THE DISCLOSURE

Process of preparing polyethylene terephthalate resin comprising carrying out a direct esterification reaction between terephthalic acid and ethylene glycol in the presence of a first stage buffer to form a polyester prepolymer and then polycondensing the resulting prepolymer in the presence of a catalyst selected from the group consisting of aluminum acetylacetonate and lead acetylacetonate.

---

This invention relates to a method of preparing highly polymeric linear polyesters. More particularly, it relates to a novel method of preparing polyethylene terephthalate resin that has physical and chemical properties that make it particularly well suited for filament- and film-forming purposes.

In general, the preparation of highly polymeric linear polyester resin from a dicarboxylic acid and a diol is well-known in the art. In the preparation of such polyesters, a dicarboxylic acid and a diol are first combined and subjected to a direct esterification reaction. The resulting product or prepolymer is then polycondensed at higher temperatures and under reduced pressure in the presence of a polycondensation catalyst to form the desired polyester resin.

From a commercial standpoint, it is essential that the polyester resin be produced in the shortest possible time and the desired degree of polymerization be obtained. A polyethylene terephthalate resin suitable for melt spinning should have a carboxyl content value of about or below 50 equivalents per million grams (eq./$10^6$ gr. or meq./kg.), an intrinsic viscosity of preferably not less than about 0.60 (as determined in a 60% phenol and 40 tetrachloroethane solution, wt./wt., at 30° C.) and a melting point preferably not less than about 258–260° C. in order for the filaments formed therefrom to possess a satisfactory level of hydrolytic stability, thermal stability, ultra-violet light stability, and a high degree of tenacity.

It is an object of the present invention to prepare a polyester resin by a direct esterification reaction between a diol and a dicarboxylic acid, followed by the polycondensation of the resulting esterified product or prepolymer.

Another object of the present invention is to provide a novel method for the preparation of polyethylene terephthalate resin having excellent properties and particularly suitable for melt extrusion into non-degraded processable filaments and films by a direct esterification and polycondensation reaction procedure.

Another object of the present invention is to provide a method for carrying out a direct esterification reaction between ethylene glycol and terephthalic acid to form a polyester prepolymer and then polycondensing the resulting prepolymer in the presence of an improved polycondensation catalyst to obtain polyethylene terephthalate.

These and other objects are accomplished in accordance with the present invention which involves a method of preparing polyethylene terephthalate wherein terephthalic acid and ethylene glycol are directly esterified in the presence of a first stage additive or buffer to form a polyester prepolymer and where the resulting polyester prepolymer is polycondensed, the improvement comprising carrying out the polycondensation of the polyester prepolymer in the presence of a catalytic amount of a compound selected from the group consisting of aluminum acetylacetonate and lead acetylacetonate.

The preparation of polyesters of the present invention via the direct esterification reaction is generally carried out with a molar ratio of ethylene glycol to terephthalic acid of from about 1:1 to about 15:1, but preferably from about 1.2:1 to about 2.5:1. The first stage direct esterification reaction of the present method is generally carried out at a temperature range of from about 220–290° C. in the absence of an oxygen-containing gas at atmospheric or elevated pressure for about 2 to 4 hours. For example, the reaction may be carried out in an atmosphere of nitrogen. When the direct esterification step is completed, as indicated, for example, by the formation of a clear reaction mixture, any remaining glycol is distilled off and a polycondensation catalyst of the present method is added to the reaction product. The second stage or polycondensation step of the present method is generally carried out under reduced pressure in the range of from about 0.05 to 20 mm. of mercury in the absence of an oxygen-containing gas at temperatures of from about 260–325° C. for about 2–5 hours.

The polycondensation catalysts of the present invention can, if indicated, be added to the present reaction mixture before initiating the direct esterification reaction between the diol and the dicarboxylic acid or after the esterified reaction product or prepolymer thereof is formed. The polycondensation catalysts of the present invention are employed in concentrations ranging from about 0.01% to about 0.2%, based on the weight of the polyester prepolymer to be polycondensed. Usually, it has been found that from about 0.02 to about 0.1% of the subject polycondensation catalysts are preferred in most instances.

Any known suitable first stage buffer or additive may be used in the direct esterification stage of the present method. For example, calcium acetate or triethylamine may be used. The first stage buffers are generally used in concentrations ranging from about $5 \times 10^{-5}$ to about $5 \times 10^{-1}$ mole per mole of dicarboxylic acid present in the initial dicarboxylic acid-diol reaction mixture.

The following examples of several preferred embodiments will further serve to illustrate the present invention. All parts are by weight unless otherwise indicated.

EXAMPLE I

A blended mixture comprising 474 g. of terephthalic acid, 288 mls. of ethylene glycol, and 149 mls. of triethylamine was charged into a reaction vessel equipped with a nitrogen inlet, a Dean-Starke separating apparatus, heating means, and stirring means. The reaction mixture was agitated and the temperature was raised to 197° C. under a nitrogen blanket, at atmospheric pressure. At about 190° C., a water-triethylamine azeotropic mixture started to distill off. The azeotropic mixture was continuously separated by means of the Dean-Starke apparatus and the triethylamine recovered was continuously returned to the reaction vessel. The esterification mixture became almost clear. Then the temperature was allowed to rise to 230° C. over a one hour period to form a polyester prepolymer. The prepolymer product was allowed to cool under an atmosphere of nitrogen.

EXAMPLE II

Fifty grams of the polyester product of Example I was mixed with 0.02 g. of aluminum acetylacetonate and placed in a reaction vessel. The reaction mixture was heated to about 280° C. under a reduced pressure of from about 0.05 to about 0.1 mm. of mercury while under agitation for about three hours to bring about the polycondensation of the polyester prepolymer. The resin formed had an intrinsic viscosity of 0.63, a carboxyl content value of 7 (meq./kg.) and a melting point of about 264° C.

EXAMPLE III

Fifty grams of the polyester product of Example I was mixed with 0.02 g. of lead acetylacetonate and placed in a reaction vessel. The reaction mixture was heated to about 280° C. under a reduced pressure of from about 0.05 to about 0.1 mm. of mercury while under agitation for about three hours to bring about the polycondensation of the polyester prepolymer. The resin formed had an intrinsic viscosity of 0.64, a carboxyl content value of 10 (meq./kg.) and a melting point of about 264° C.

The intrinsic viscosities of the polyester resin products of the above examples were measured in a 60% phenol and 40% tetrachloroethane solution, wt./wt., at 30° C. The other analytical values as set forth in the above examples were determined by conventional laboratory procedures.

The process of the present invention has been described with particular reference to polyethylene terephthalate, but it will be obvious that the subject invention also includes within its scope the preparation of other polymeric polymethylene terephthalates formed from glycols of the series $HO(CH_2)_nOH$, where $n$ is 2 to 10 and terephthalic acid and other suitable dicarboxylic acids, such as isophthalic acid.

The polyester resins in the above examples are characterized by their high molecular weights, as indicated by their intrinsic viscosities, high melting points and low carboxyl content values, indicating that they are particularly well suited for melt spinning into filaments and fibers, and for the production of films.

We claim:
1. In a process of preparing polyethylene terephthalate resin wherein terephthalic acid and ethylene glycol are directly esterified in the presence of a first stage buffer to form a polyester prepolymer and where the resulting polyester prepolymer is polycondensed, the improvement comprising adding to said prepolymer a catalytic amount of a polycondensation catalyst consisting of aluminum acetylacetonate or lead acetylacetonate and then carrying out the polycondensation of said prepolymer.
2. The process of claim 1 wherein the catalyst is present in an amount ranging from about 0.01% to about 0.2%, based on the weight of the polyester prepolymer.
3. The process of claim 1 wherein the catalyst is aluminum acetylacetonate.
4. The process of claim 1 wherein the catalyst is lead acetylacetonate.

References Cited

UNITED STATES PATENTS

| | | | |
|---|---|---|---|
| 2,857,363 | 10/1958 | Easley et al. | 260—75 |
| 3,245,959 | 12/1966 | Roeser | 260—75 |

FOREIGN PATENTS 1,297,516  5/1962  France.

WILLIAM H. SHORT, Primary Examiner

L. P. QUAST, Assistant Examiner

UNITED STATES PATENT OFFICE
CERTIFICATE OF CORRECTION

Patent No. 3,528,945      Dated September 15, 1970

Inventor(s) Mary J. Stewart and John A. Price

It is certified that error appears in the above-identified patent and that said Letters Patent are hereby corrected as shown below:

Col. 1, line 46, "40" should read --40%--
Col. 2, line 38, "0.02" should read --0.02%--

SIGNED AND SEALED
NOV 17 1970

(SEAL)
Attest:

Edward M. Fletcher, Jr.
Attesting Officer

WILLIAM E. SCHUYLER, JR.
Commissioner of Patents